(12) United States Patent
Zhu et al.

(10) Patent No.: US 11,834,984 B2
(45) Date of Patent: Dec. 5, 2023

(54) DUAL-FUEL INTELLIGENT COMBUSTION SYSTEM AND CONTROL METHOD THEREOF

(71) Applicant: TAIYUAN UNIVERSITY OF TECHNOLOGY, Shanxi (CN)

(72) Inventors: Jianjun Zhu, Taiyuan (CN); Keying Wang, Taiyuan (CN); Buyong Zhang, Taiyuan (CN)

(73) Assignee: Taiyuan University of Technology, Shanxi (CN)

( * ) Notice: Subject to any disclaimer, the term of this patent is extended or adjusted under 35 U.S.C. 154(b) by 0 days.

(21) Appl. No.: 18/004,915

(22) PCT Filed: Jun. 28, 2022

(86) PCT No.: PCT/CN2022/101714
§ 371 (c)(1),
(2) Date: Jan. 10, 2023

(87) PCT Pub. No.: WO2023/274184
PCT Pub. Date: Jan. 5, 2023

(65) Prior Publication Data
US 2023/0243296 A1 Aug. 3, 2023

(30) Foreign Application Priority Data
Jul. 1, 2021 (CN) .......................... 202110743432.1

(51) Int. Cl.
*F02B 69/02* (2006.01)
*F02B 77/08* (2006.01)
(Continued)

(52) U.S. Cl.
CPC .............. *F02B 69/02* (2013.01); *F02B 77/08* (2013.01); *F02D 19/0655* (2013.01);
(Continued)

(58) Field of Classification Search
CPC ...... F02B 69/02; F02B 77/08; F02D 19/0655; F02D 19/08; F02D 41/3094; F02F 3/00
(Continued)

(56) References Cited

FOREIGN PATENT DOCUMENTS

| CN | 111120119 A | * | 5/2020 | |
| CN | 212003356 U | * | 11/2020 | ........... F02D 19/081 |

(Continued)

OTHER PUBLICATIONS

CN112112729A (Dec. 22, 2020) (Peng et al.) (Machine Translation) (Year: 2020).*

*Primary Examiner* — Mahmoud Gimie
(74) *Attorney, Agent, or Firm* — Reising Ethington P.C.

(57) ABSTRACT

The present disclosure belongs to the field of dual-fuel engine combustion systems, in particular to a dual-fuel intelligent combustion system and a control method thereof. The dual-fuel intelligent combustion system comprises a cylinder body, a cylinder cover, a piston, a methanol fuel injector, a diesel injector and ECUs (electronic control units), wherein the cylinder body, the cylinder cover and the piston form a combustion chamber, the cylinder cover is arranged right above the cylinder body, the piston is arranged in the cylinder body, the combustion chamber is provided with an air inlet channel and an air outlet channel, the combustion chamber is internally provided with the methanol fuel injector for injecting alcohol fuel into a cylinder and the diesel injector for injecting ignition fuel diesel into the cylinder, and the methanol fuel injector and the diesel injector are respectively controlled by the two ECUs.

3 Claims, 2 Drawing Sheets

(51) Int. Cl.
  *F02D 19/08*    (2006.01)
  *F02D 41/30*    (2006.01)
  *F02D 19/06*    (2006.01)
  *F02F 3/00*     (2006.01)
(52) U.S. Cl.
  CPC ......... *F02D 19/08* (2013.01); *F02D 41/3094* (2013.01); *F02F 3/00* (2013.01)
(58) Field of Classification Search
  USPC ........................................................ 123/575
  See application file for complete search history.

(56) References Cited

FOREIGN PATENT DOCUMENTS

| | | | | |
|---|---|---|---|---|
| CN | 112112729 A | * | 12/2020 | ................ F01L 3/06 |
| CN | 214355885 U | * | 10/2021 | |

* cited by examiner

DUAL-FUEL INTELLIGENT COMBUSTION SYSTEM AND CONTROL METHOD THEREOF

CROSS-REFERENCE TO RELATED APPLICATIONS

This patent application claims the benefit and priority of Chinese Patent Application No. 202110743432.1, filed with the China National Intellectual Property Administration on Jul. 1, 2021, the disclosure of which is incorporated by reference herein in its entirety as part of the present application.

TECHNICAL FIELD

The present disclosure belongs to the field of dual-fuel engine combustion systems, in particular to a dual-fuel intelligent combustion system and a control method thereof.

BACKGROUND OF THE INVENTION

Under the double backgrounds of the shortage of petroleum resources and the environmental pollution, it is of great practical significance to develop cheap and clean alternative energy sources. Methanol fuel is a renewable energy source from a variety of sources. In recent years, methanol fuel has been widely used in dual-fuel engines because of the advantages of wide ignition limit, low molecular weight, high oxygen content and large latent heat of vaporization. However, due to the large latent heat of methanol vaporization, the engine cold start is difficult, even the engine cannot be started in low temperature environment, and the use of the engine is limited. At present, most of researches focus on an air inlet injection method, but there are few researches on the in-cylinder dual-injection mode of methanol and diesel.

The basic idea of homogeneous charge compression ignition (HCCI) combustion mode is to solve the shortcomings of low efficiency of the traditional gasoline engine and high NOx and soot emissions of the traditional diesel engine. Homogeneous charge organization mode of gasoline engines and compression ignition mode of the diesel engine are adopted, that is, the characteristics of low NOx and soot emissions of the gasoline engine and high efficiency of the diesel engine are realized. Compared with the traditional premixed combustion and diffusion combustion, the homogeneous charge compression ignition combustion mode has the advantages of low particulate emission, high heat efficiency and fuel flexibility. A variety of fuels including gasoline, diesel, natural gas, liquefied petroleum gas (LPG), methanol, ethanol, dimethyl ether and mixed fuel can be used. Although a series of achievements have been made in the research of homogeneous charge compression ignition combustion mode at present, there are still many limitations. Because the combustion is dominated by chemical reaction kinetics, it is quite difficult to control the ignition moment and combustion rate of the HCCI mode. In order to expand the load range of the engine in the HCCI mode and obtain relatively high indicated heat efficiency under different loads, a dual-fuel HCCI combustion mode is proposed. Therefore, by adopting diesel and methanol homogeneous compression ignition combustion mode, the difficulty of methanol cold start on the engine can be overcome, and the defects of the HCCI combustion mode further can be effectively solved.

SUMMARY OF THE INVENTION

The present disclosure provides a dual-fuel intelligent combustion system and a control method thereof in order to solve the problem that the methanol cold start is difficult, improve the combustion efficiency and heat efficiency of an engine, and improve the fuel economy and emission cleanliness of the engine.

The present disclosure adopts the following technical scheme. A dual-fuel intelligent combustion system comprises a cylinder body, a cylinder cover, a piston, a methanol fuel injector, a diesel injector and ECUs (electronic control units), wherein the cylinder body, the cylinder cover and the piston form a combustion chamber, the cylinder cover is arranged right above the cylinder body, the piston is arranged in the cylinder body, the combustion chamber is provided with an air inlet channel and an air outlet channel, the combustion chamber is internally provided with the methanol fuel injector for injecting alcohol fuel into a cylinder and the diesel injector for injecting ignition fuel diesel into the cylinder, and the methanol fuel injector and the diesel injector are respectively controlled by the two ECUs.

Further, the top surface of the piston is eccentrically provided with a ω-shaped pit, the methanol fuel injector is obliquely arranged right above the center of the ω-shaped pit, the included angle between the central axis of the methanol fuel injector and the central axis of the cylinder is 0° to 10°, the diesel injector is obliquely arranged above the ω-shaped pit and does not coincide with the position of the methanol fuel injector, and the included angle between the central axis of the diesel injector and the central axis of the cylinder is 10° to 25°, as shown in FIG. 2.

Further, the input ends of the two ECUs are respectively connected with a cylinder pressure sensor, a crankshaft position sensor and a camshaft sensor, the cylinder pressure sensor is installed on the cylinder cover, the crankshaft position sensor is installed at the position close to a flywheel disc on a machine body, and the camshaft sensor is installed at the position close to a camshaft on the machine body, as shown in FIG. 1. Detected engine running data are transmitted to the two ECUs, so that the current running condition of the engine can be obtained. An air inlet temperature sensor, an air inlet pressure sensor, an air outlet temperature sensor and an air outlet pressure sensor are used for respectively transmitting collected temperature and pressure signals to the two ECUs for detecting the current environment of the engine.

The two ECUs judge the current working environment and running condition of the engine according to the data transmitted by each sensor. According to the different performance requirements of the engine for the current state, different combustion modes can be flexibly switched by respectively controlling two injection systems of methanol and diesel, and duel-fuel homogeneous compression combustion is mainly performed.

A control method of the dual-fuel intelligent combustion system is also disclosed. During cold start, a pure diesel oil working mode is adopted to ensure stable combustion and normal start.

When the engine runs at low speed and low load, that is, when the rotating speed is in the range of 800-1200 rpm and the $P_{mc}$ is less than 0.3 MPa, the methanol fuel injector and the diesel injector are respectively controlled by two ECUs, methanol fuel is injected in the air inlet stroke to form a homogeneous gas premixture in the cylinder, and diesel fuel is injected later than methanol fuel in the air inlet stroke to ignite the methanol fuel, so that the fuel economy is ensured, and the emissions are reduced.

When the engine runs at low speed and high load, that is, when the rotating speed is in the range of 800-1200 rpm and the $P_{mc}$ is more than 0.3 MPa and less than 1 MPa, a pure diesel oil working mode is adopted, so that the stability of combustion is ensured, and knocking is restricted.

When the engine runs at medium speed, that is, when the rotating speed is in the range of 1200-1800 rpm, the methanol fuel injector and the diesel injector are respectively controlled by two ECUs, and methanol fuel and diesel fuel are injected at the early stage of the compression stroke to form a homogeneous charge. When the piston is compressed near the top dead center, the homogeneous charge ignites spontaneously to realize an HCCI (homogeneous charge compression ignition) combustion mode.

When the engine runs at high speed and low load, that is, when the rotating speed is in the range of more than 1800 rpm and the $P_{mc}$ is less than 0.3 MPa, the methanol fuel injector and the diesel injector are respectively controlled by two ECUs, and methanol fuel and diesel fuel are injected at the early stage of the compression stroke to form a homogeneous charge. When the piston is compressed near the top dead center, the homogeneous charge ignites spontaneously to realize an HCCI combustion mode.

When the engine runs at high speed and high load, that is, when the rotating speed is in the range of more than 1800 rpm and the $P_{mc}$ is more than 0.6 MPa, a pure diesel oil working mode is adopted, so that the method is used for restricting knocking, and the heat efficiency is improved.

Compared with the prior art, full utilization of different fuels is realized by arranging two fuel injection systems in the cylinder. By controlling the flexible switching of different combustion modes and reasonably utilizing the physical and chemical characteristics of different fuels, the problem that methanol fuel cold start is difficult is effectively solved, and the heat efficiency of the engine is improved. By using clean fuel methanol, the problem that the emission pollution of the pollution is serious is improved, and the fuel economy of the engine is improved.

Reference signs: 1, cylinder body; 2, piston; 3, cylinder cover; 4, air outlet channel; 5, methanol fuel injector; 6, diesel injector; and 7, air inlet channel.

DETAILED DESCRIPTION OF THE INVENTION

The present disclosure is further described in conjunction with the specific embodiments and the attached figures.

Figure 1:
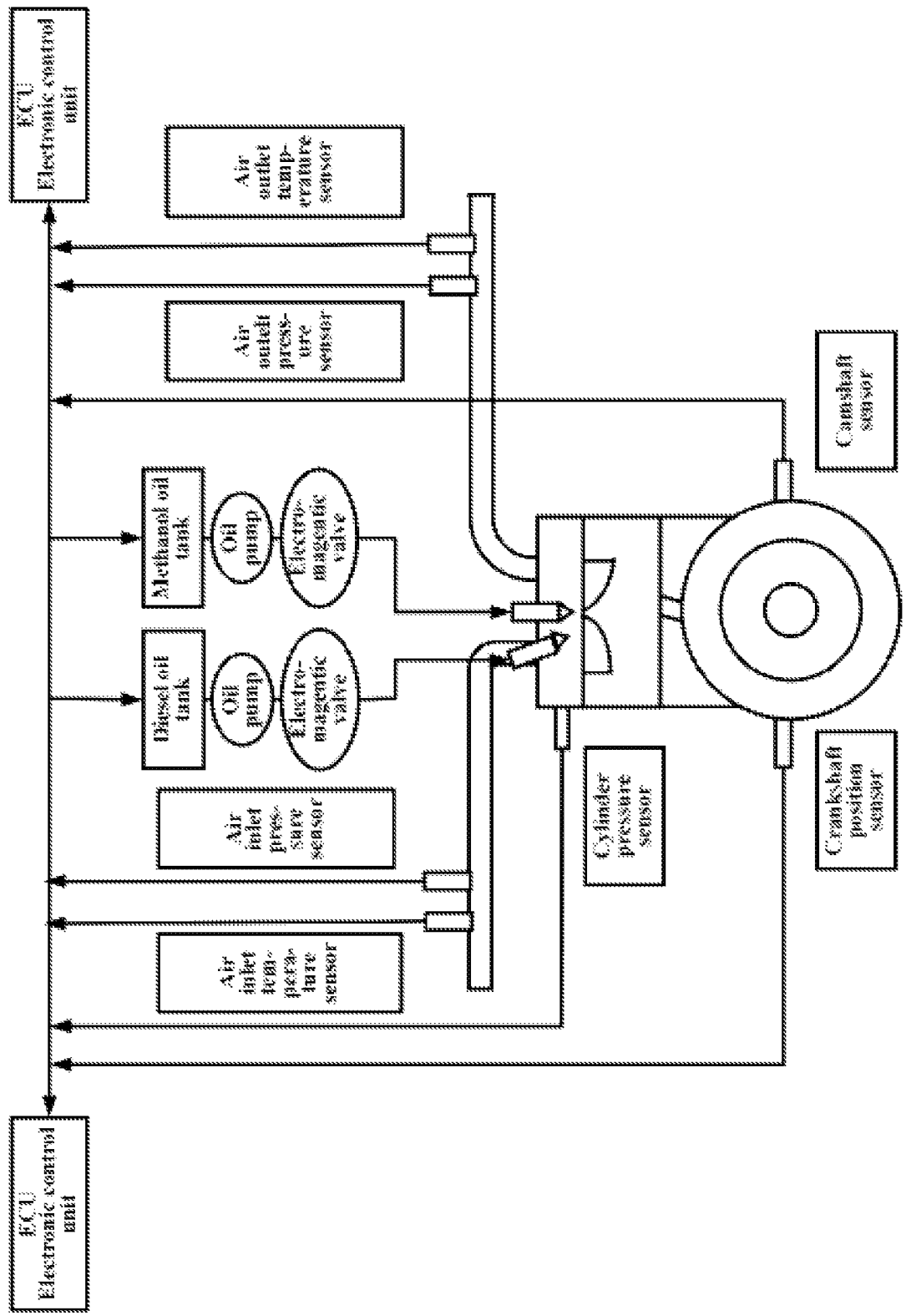
FIG. 1 is a specific arrangement diagram of an intelligent combustion system.
Figure 2:
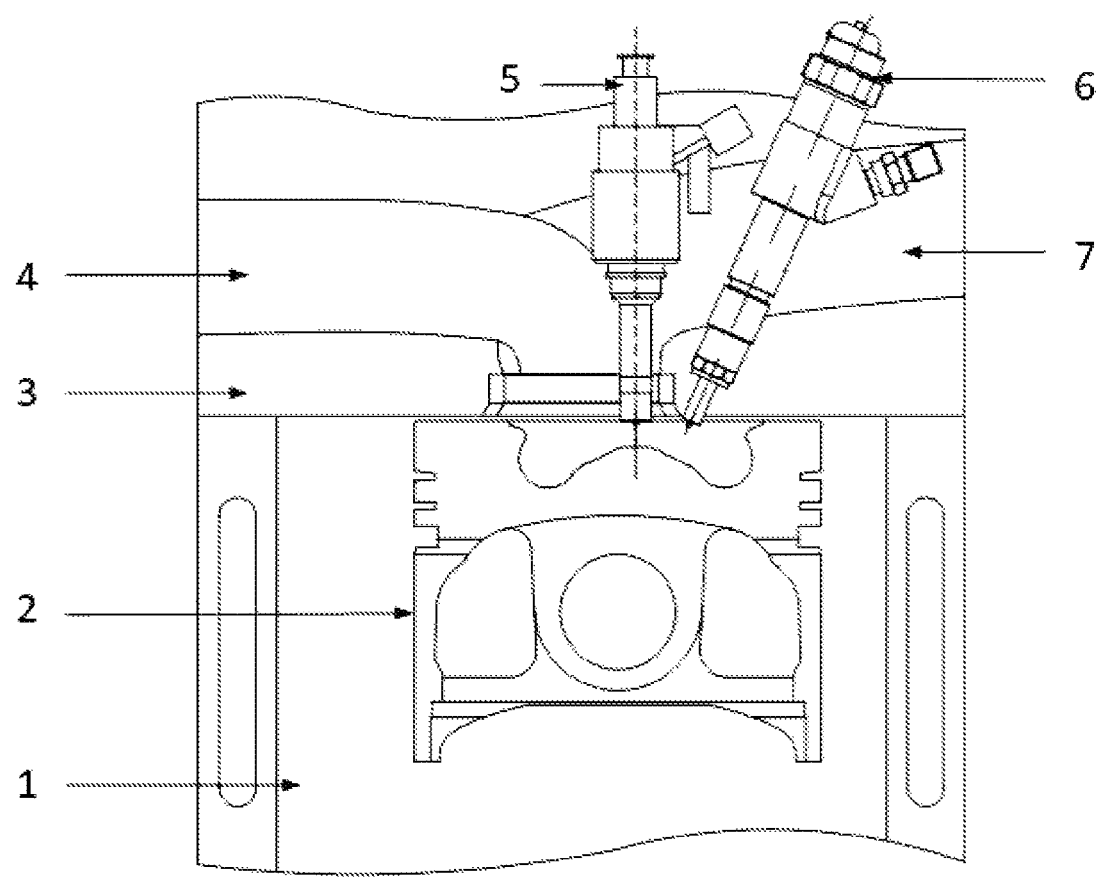
FIG. 2 is a structural schematic diagram of an intelligent combustion system.

As shown in FIG. 1 to FIG. 2, disclosed is a dual-fuel intelligent combustion system, comprising a cylinder body 1, a cylinder cover 3, a piston 2, a methanol fuel supply system, a diesel fuel supply system and electronic control units (ECUs). The cylinder body 1, the cylinder cover 3 and the piston 2 form a combustion chamber. The cylinder cover is placed right above the cylinder body 1. The piston is placed in the cylinder body. The combustion chamber is provided with an air inlet channel 7 and an air outlet channel 4. The combustion chamber is internally provided with the methanol fuel injector 5 for injecting alcohol fuel into a cylinder and further provided with the diesel injector 6 for injecting ignition fuel diesel into the cylinder. Through the injection strategy that methanol fuel and diesel fuel are respectively controlled by the two ECUs, the homogeneous charge compression ignition combustion mode of methanol fuel and diesel fuel under ordinary working conditions is realized, and different combustion modes are flexibly switched under different working conditions.

The top surface of the piston 2 is eccentrically provided with a ω-shaped pit. The methanol fuel injector 5 is obliquely arranged right above the center of the ω-shaped pit. The included angle between the central axis of the methanol fuel injector 5 and the central axis of the cylinder is 0° to 10°. The diesel injector 6 is obliquely arranged above the ω-shaped pit with a certain distance from methanol fuel injector 5. The included angle between the central axis of the diesel injector 6 and the central axis of the cylinder is 10° to 25°, as shown in FIG. 1.

When the engine runs, a cylinder pressure sensor, a crankshaft position sensor, a camshaft sensor and a rotating speed sensor are respectively connected with the input ends of the two ECUs, and detected engine running data are transmitted to the two ECUs, so that the current running condition of the engine can be obtained. An air inlet temperature sensor, an air inlet pressure sensor, an air outlet temperature sensor and an air outlet pressure sensor are used for respectively transmitting collected temperature and pressure signals to the two ECUs for detecting the current environment of the engine.

By adopting the control of the two ECUs, the ECUs judge the current working environment and running condition of the engine according to the data transmitted by each sensor. According to the different performance requirements of the engine for the current state, different combustion modes can be flexibly switched by respectively controlling two injection systems of methanol and diesel. Injection strategies such as injection quantity and injection moment of the two fuels are made, and relevant control signals are transmitted to the injectors 5 and 6 to accurately control the injection of the two fuels. The dual-fuel homogeneous compression combustion mode is mainly adopted.

A control method of the dual-fuel intelligent combustion system is also disclosed. During cold start, a pure diesel oil working mode is adopted to ensure stable combustion and normal start.

When the engine runs at low speed and low load, that is, when the rotating speed is in the range of 800-1200 rpm and the $P_{mc}$ is less than 0.3 MPa, the methanol fuel injector and the diesel injector are respectively controlled by two ECUs, methanol fuel is injected in the air inlet stroke to form a homogeneous gas premixture in the cylinder, and diesel fuel is injected later than methanol fuel in the air inlet stroke to ignite the methanol fuel, so that the fuel economy is ensured, and the emissions are reduced.

When the engine runs at low speed and high load, that is, when the rotating speed is in the range of 800-1200 rpm and the $P_{mc}$ is more than 0.3 MPa and less than 1 MPa, a pure diesel oil working mode is adopted, so that the stability of combustion is ensured, and knocking is restricted.

When the engine runs at medium speed, that is, when the rotating speed is in the range of 1200-1800 rpm, the methanol fuel injector and the diesel injector are respectively controlled by two ECUs, and methanol fuel and diesel fuel are injected at the early stage of the compression stroke to form a homogeneous charge. When the piston is compressed near the top dead center, the homogeneous charge ignites spontaneously to realize an HCCI (homogeneous charge compression ignition) combustion mode.

When the engine runs at high speed and low load, that is, when the rotating speed is in the range of more than 1800 rpm and the $P_{mc}$ is less than 0.3 MPa, the methanol fuel injector and the diesel injector are respectively controlled by two ECUs, and methanol fuel and diesel fuel are injected at the early stage of the compression stroke to form a homogeneous charge. When the piston is compressed near the top dead center, the homogeneous charge ignites spontaneously to realize an HCCI combustion mode.

When the engine runs at high speed and high load, that is, when the rotating speed is in the range of more than 1800 rpm and the $P_{mc}$, is more than 0.6 MPa, a pure diesel oil working mode is adopted, so that the method is used for restricting knocking, and the heat efficiency is improved.

The invention claimed is:

1. A dual-fuel intelligent combustion system, comprising a cylinder body, a cylinder cover, a piston, a methanol fuel injector, a diesel injector and electronic control units (ECUs), wherein the cylinder body, the cylinder cover and the piston form a combustion chamber, the cylinder cover is arranged right above the cylinder body, the piston is arranged in the cylinder body, the combustion chamber is provided with an air inlet channel and an air outlet channel, the combustion chamber is internally provided with the methanol fuel injector for injecting alcohol fuel into a cylinder and the diesel injector for injecting ignition fuel diesel into the cylinder, and the methanol fuel injector and the diesel injector are respectively controlled by two ECUs;
   wherein a top surface of the piston is eccentrically provided with an ω-shaped pit, the methanol fuel injector is obliquely arranged right above a center of the ω-shaped pit, an included angle between a central axis of the methanol fuel injector and a central axis of the cylinder is 0° to 10°, the diesel injector is obliquely arranged above the ω-shaped pit and does not coincide with a position of the methanol fuel injector, and an included angle between a central axis of the diesel injector and the central axis of the cylinder is 10° to 25°.

2. The dual-fuel intelligent combustion system according to claim 1, wherein input ends of the two ECUs are respectively connected with a cylinder pressure sensor, a crankshaft position sensor and a camshaft sensor, the cylinder pressure sensor is installed on the cylinder cover, the crankshaft position sensor is installed at a position close to a flywheel disc on a machine body, and the camshaft sensor is installed at a position close to a camshaft on the machine body.

3. A control method of the dual-fuel intelligent combustion system according to claim 2, wherein during cold start, a pure diesel oil working mode is adopted to ensure stable combustion and normal start;
   when an engine runs at a low speed and a low load, that is, when a rotating speed is in a range of 800-1200 rpm and $P_{me}$ is less than 0.3 MPa, the methanol fuel injector and the diesel injector are respectively controlled by the two ECUs, methanol fuel is injected in an air inlet stroke to form a homogeneous gas premixture in the cylinder, and diesel fuel is injected later than the methanol fuel in the air inlet stroke to ignite the methanol fuel;
   when the engine runs at the low speed and a high load, that is, when the rotating speed is in the range of 800-1200 rpm and the $P_{me}$ is more than 0.3 MPa and less than 1 MPa, the pure diesel oil working mode is adopted;
   when the engine runs at a medium speed, that is, when the rotating speed is in a range of 1200-1800 rpm, the methanol fuel injector and the diesel injector are respectively controlled by the two ECUs, and the methanol fuel and the diesel fuel are injected at an early stage of a compression stroke to form a homogeneous charge; and when the piston is compressed near a top dead center, the homogeneous charge ignites spontaneously to realize an HCCI (homogeneous charge compression ignition) combustion mode;
   when the engine runs at a high speed and the low load, that is, when the rotating speed is in a range of more than 1800 rpm and the $P_{me}$ is less than 0.3 MPa, the methanol fuel injector and the diesel injector are respectively controlled by the two ECUs, and the methanol fuel and the diesel fuel are injected at the early stage of the compression stroke to form the homogeneous charge; and when the piston is compressed near the top dead center, the homogeneous charge ignites spontaneously to realize the HCCI combustion mode; and
   when the engine runs at the high speed and a high load, that is, when the rotating speed is in the range of more than 1800 rpm and the $P_{me}$ is more than 0.6 MPa, the pure diesel oil working mode is adopted.

\* \* \* \* \*